TOUCH CONTROL CIRCUIT
Filed April 25, 1962
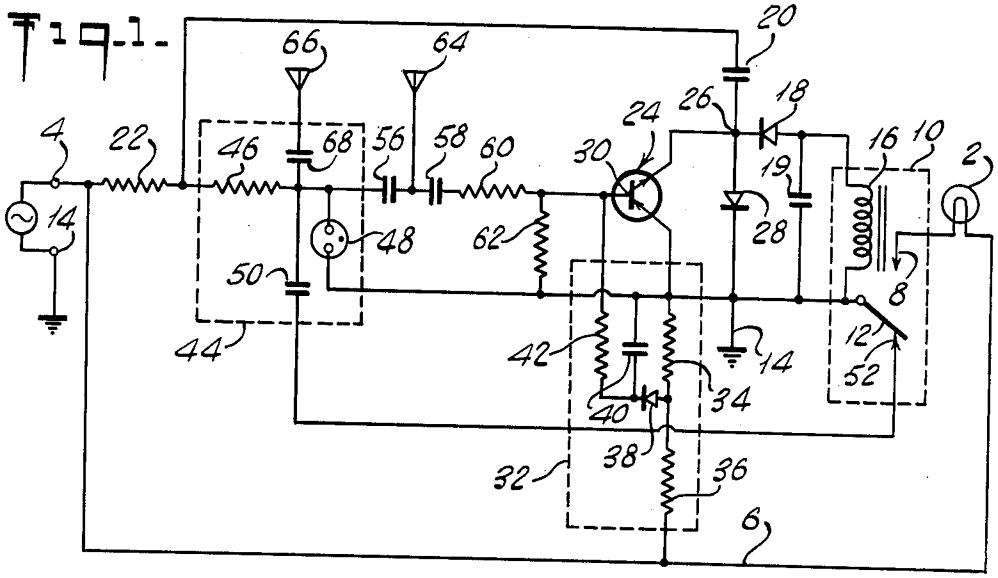
Fig. 2.
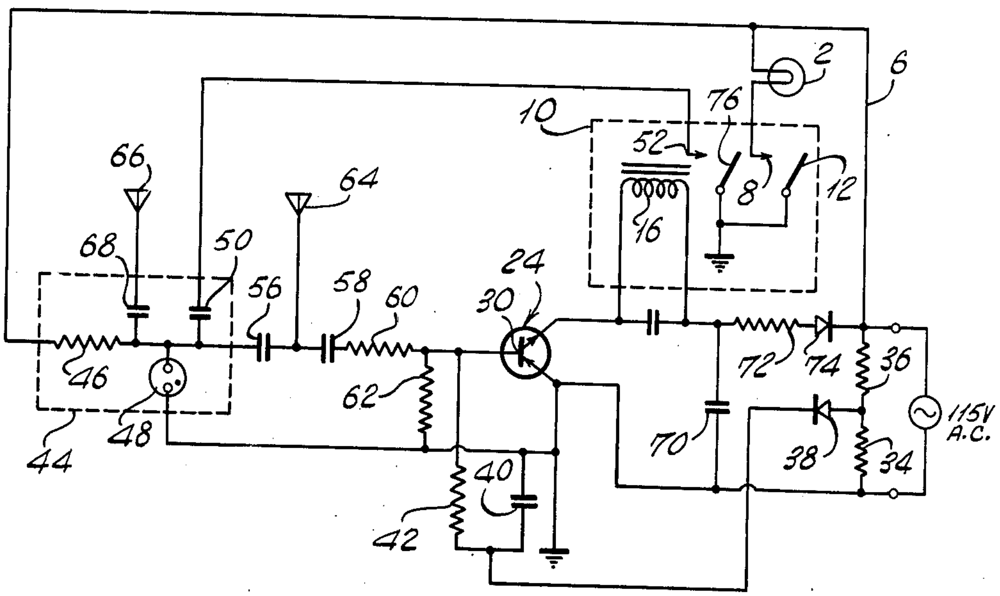
INVENTORS
CARL E. ATKINS &
ROBERT L. ZIOLKOWSKI
BY
Eyre, Mann & Lucas
ATTORNEYS Aug. 10, 1965

C. E. ATKINS ETAL 3,200,304

TOUCH CONTROL CIRCUIT

Filed April 25, 1962

3 Sheets-Sheet 2

INVENTORS
CARL E. ATKINS &
ROBERT L. ZIOLKOWSKI

BY

Pyne, Mann & Lucas

ATTORNEYS

INVENTORS
CARL E. ATKINS &
ROBERT L. ZIOLKOWSKI
BY
Eyre, Mann & Lucas
ATTORNEYS

United States Patent Office 3,200,304

Patented Aug. 10, 1965

3,200,304
TOUCH CONTROL CIRCUIT

Carl E. Atkins, Great Notch, and Robert L. Ziolkowski, South Plainfield, N.J., assignors to Tung-Sol Electric Inc., a corporation of Delaware Filed Apr. 25, 1962, Ser. No. 190,063
16 Claims. (Cl. 317—146)

Figure 3:
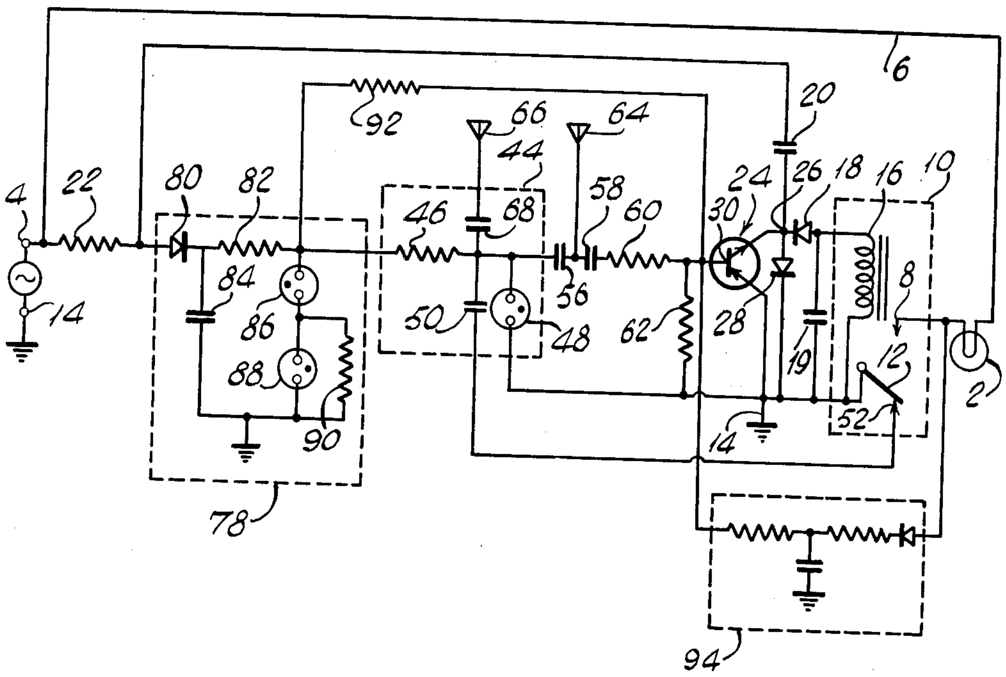

The present invention relates to touch control circuits and more particularly to control circuits for opening or closing a load circuit in response to the touch of an individual.

Various circuits for control of a load in response to the touch of an individual or to the proximity of an individual have heretofore been proposed. These prior circuits have various drawbacks which have limited their utility. Certain of the prior circuits require delicate adjustment for operation at a specific frequency which reduces their reliability in use. Others employ high frequency oscillatory signal sources which create radio interference. Still other prior art circuits employ complex electronic and electromechanical stepping circuitry which adds to the cost and size of the installation. All these previous circuits consume considerable electrical energy while the load circuit is open, or at standby, so that in many cases the cost of operating the circuit outweighs its advantages.

In the present invention high frequency oscillators or complex stepping circuitry are not required, and in certain embodiments, the loading on the power circuits during standby is capacitative thus minimizing power consumption.

Generally, circuits embodying the features of the present invention contain a relay for opening and closing a load circuit. To control the relay a semiconductor switching device is connected either in series or in parallel with the relay winding so that energization of the relay is dependent on the operating state of the semiconductor device. In addition to the semiconductor device and relay, the circuit includes two elements to be touched by an individual and a low frequency oscillator, whose output is fed to the base of the semiconductor device. The base of the device is so biased that when the signal from the low frequency oscillator is suppressed the device is in its non-conducting state.

One of the touch responsive elements is so connected between the oscillator and the semiconductor device that when it is touched it suppresses the application of the oscillating output of the oscillator to the gate sufficiently to cause the semiconductor device to stop conducting. Operation of the relay, in response to change of condition of the semiconductor device, not only controls the load circuit but also so varies the circuit of the semiconductor device as to maintain that device non-conducting after the signal to the base of the device is restored upon removal of the hand of the operator from the first touch control element.

To cause the semiconductor device to again conduct, the second touch responsive element is touched. This momentarily causes the semiconductor device to conduct and operate the relay. The relay then returns the circuit to its initial state permitting the output of the oscillating source at the base of the semiconductor device to switch the device to its conductive state.

In carrying out this invention a number of techniques and circuits may be employed. The low frequency source of energy may be, for example, a low frequency relaxation oscillator or multivibrator which is coupled through a high impedance circuit to the semiconductor device. The touch responsive elements are usually conductive members capacitatively coupled to the circuit. The semiconductor device may be, and preferably is, a four zone germanium PNPN semiconductor device which is available commercially under the designation 2N–1966. The base of the semiconductor, the inner N zone, is generally kept biased positively with respect to the emitter. Like a thyratron the semiconductor device may be triggered into conduction by application of a negative pulse to its base but unlike a thyratron the device may be triggered non-conducting by positive voltage at its base terminal. However, it should be understood these are not the only means of carrying out the invention and other elements and circuits may be substituted within the scope of the invention.

In the illustrated embodiments various control circuits are used for triggering the semiconductor device. All of them, however, use the suppression of the signal from the oscillator to the base of the semiconductor device to trigger the semiconductor device and they all use the making and breaking of the relay contacts to maintain the semiconductor device in its triggered condition until a second touch element is contacted.

Figure 4:
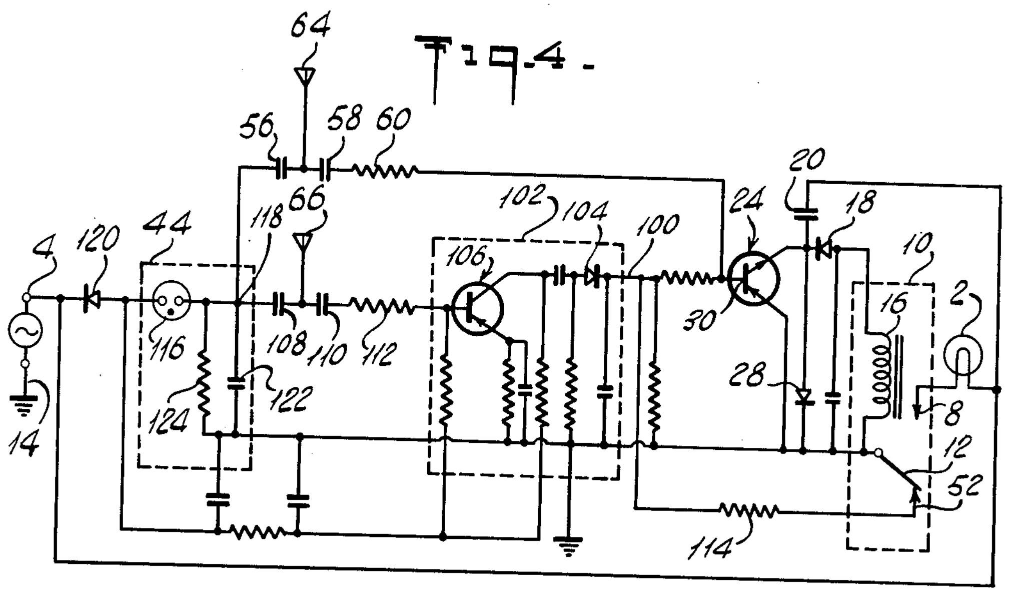

For a better understanding of the invention and of specific circuits embodying the same reference may be had to the accompanying drawings of which:

FIG. 1 is an electrical schematic diagram of the preferred circuit incorporating the features of the invention; and FIGS. 2 through 4 are electrical schematics of other circuits incorporating the features of the invention.

Referring now to FIG. 1, one terminal of a lamp 2, which represents the load circuit, is connected to the ungrounded terminal 4 of a 115 v. 60 cycle power supply by line 6. The other terminal of the lamp is connected to a normally open contact 8 of a relay 10 so that as long as the relay is deenergized the load circuit remains open. When the relay is energized the arm 12 of the relay contacts the normally open contact 8 to complete the circuit through the lamp to the grounded terminal 14 of the power supply. The winding 16 of the relay 10 has one of its terminals connected to ground 14 and its other terminal connected to the anode of a diode 18. A capacitor 19 is connected across the relay winding. The cathode of diode 18 is connected through a capacitor 20 and resistor 22 to the ungrounded terminal 4 of the power supply.

A four layer semiconductor device 24 has its emitter connected to the grounded terminal 14 of the power supply and its collector connected to the junction 26 of capacitor 20 and cathode of diode 18. Coupled across the semiconductor device 24 is a second diode 28 which conducts during the positive half cycle of the voltage wave across the semiconductor device 24 to put point 26 at ground potential during those positive half cycles. During the negative half cycles of the voltage across the semiconductor device 24, the device 24, if it is conducting, provides a low resistance shunt across the relay winding 16 which reduces the current through the relay below the level necessary to keep the relay energized. Thus the lamp circuit remains open when the semiconductor device 24 is conducting, the relay winding being shunted by the semiconductor device 24 during the negative half cycle and being shunted by diode 28 during the positive half cycle. When the semiconductor device 24 is rendered non-conductive, sufficient current flows through the coil 16 on the negative half cycles of the potential across the semiconductor device 24 to energize the relay so it picks up its armature 12 and completes the circuit through the lamp 2. With the semiconductor device conducting, most of the voltage drop is across the loading capacitor 20 so the loading across the power supply terminals 4 and 14 is mainly capacitative and therefore is primarily non-consuming. Also, because of the capacitive loading, at al times, the potential across the collector and emitter terminals of the semiconductor switching device 24 leads the line voltage. The diode 18 prevents the seepage of charge from capacitor 19 during the positive half cycle of the applied voltage.

The semiconductor device 24 is a four layer PNPN germanium switching device which is triggered into conduction by application of a negative voltage pulse to its inner N zone and rendered non-conducting by positive bias applied to such terminal. A source of positive bias for the base 30 of device 24 is provided by a network within the dashed enclosure 32. The network comprises a pair of serially connected dividing resistors 34 and 36 which are connected across the grounded and ungrounded terminals of the supply to provide a stepped down voltage at their common junction. This common junction is connected to the anode of a diode 38. The cathode of the diode is connected to a filter composed of a capacitor 40 between the diode and ground 14 and a resistor 42 joining the diode to the base 30 of semiconductor device 24.

Negative triggering pulses for the base of device 24 are provided by a low frequency relaxation oscillator 44 whose oscillating output is summed with the output of the positive voltage source 32 to drive the voltage at the base 30 negative. The oscillating signal source 44 consists of a resistor 46 and neon tube 48 coupled in series between the grounded and ungrounded terminals of the power supply by the loading resistor 22. A capacitor 50 is shunted across the neon tube 48 to ground through the normally closed terminal 52 of the relay. So long as the relay remains deenergized the circuit through the capacitor is completed and the low frequency oscillator 44 supplies an output through two capacitors 56 and 58 and a series resistor 60 to be added with the output from the positive supply 32 across resistor 62.

A touch responsive device 64, which when contacted by the hand suppresses the application of the oscillating energy to the base 30 of the semiconductor device 24, is connected between the capacitors 56 and 58. These capacitors 56 and 58 block the A.C. line voltage so that it does not shock the person contacting the element 64 and does not reach the base of the semiconductor device 30. In addition, capacitor 56 in combination with the body capacity element 64 causes the suppression of the pulses from the oscillator 44. When the oscillating energy is suppressed, the voltage at the base remains positive rendering the semiconductor device non-conductive. This causes energization of the relay coil 16 so that the relay 10 completes the light circuit and breaks the ground connection to the oscillator capacitor 50. With the breaking of the ground connection the oscillation stops. Therefore after the touch is removed from the touch responsive device the base 30 remains positive, and the semiconductor device 24 remains non-conducting.

A second touch point 66 is connected through a second oscillating capacitor 68 to the oscillator resistor 46 and neon tube 48. If it is touched while the oscillator 44 is disconnected from ground by the relay 10 it supplies the necessary capacitance to start the oscillator.

In operation, the oscillator 44 supplies oscillating voltage to the base 30 of the semiconductor device 24 where it is added with the positive voltage from network 32. This provides negative going pulses to keep the semiconductor device 24 conducting. The conducting semiconductor device 24 keeps the flow of current through the coil 16 of the relay 10 below the level necessary to maintain the relay 10 energized. With the relay deenergized the light circuit remains open and the oscillating circuit through the oscillator capacitor 50 is kept closed.

When the first touch responsive means 64 is touched it suppresses the application of negative pulses to the base 30 of the semiconductor device so that the voltage at the base 30 no longer goes negative and therefore the semiconductor device stops conducting. With the semiconductor device non-conducting the relay energizes to complete the load circuit and remove the capacitor 50 from the oscillating circuit 44. The removal of the capacitor 50 from the oscillating circuit stops oscillation preventing reenergization of the semiconductor device 24 when the touch is removed from the first touch responsive element 64.

If the touch element 66 is contacted it provides the necessary capacity for oscillation. This supplies the required pulsating energy to the base 30 of the semiconductor device 24 to make it conduct. With conduction of the semiconductor device 24 the current through the coil 16 of the relay drops below the level necessary to maintain the relay energized and the relay deenergizes breaking the load circuit and completing the oscillating circuit through capacitor 50. Therefore after the hand is removed from the second touch responsive element the oscillation continues and provides the necessary negative potential to keep the semiconductor 24 conducting.

FIG. 2 illustrates a similar system wherein the semiconductive device 24 and the winding 16 of the relay are connected in series instead of in parallel. In this circuit the winding 16 and the semiconductor device are connected across the output of a filter consisting of a capacitor 70 and a resistor 72. This filter is connected through diode 74 to the 115 v. power source to supply a potential to the winding 16 and the semiconductor device 24. In addition to filtering, the filter acts as a dividing network to step down the voltage so the semiconductor device 24 is properly excited for series operation. Since in series operation, the relay is energized when the semiconductor device conducts, the capacitor 50 must be connected to ground simultaneously with the grounding of the lamp 2. Therefore a second relay arm 76 is provided for making the connection.

In operation the relay is normally deenergized and the contacts 52 and 76, and 8 and 12 are open. With the contacts 52 and 76 open the oscillator 44 is quiescent, and therefore the voltage at the base 30 remains positive. To energize the oscillating circuit 44 and thus energize the relay the element 66 is touched. When element 66 is touched the body capacity of the person touching the element and capacitor 68 are introduced into the oscillating circuit 44 to start it oscillating. With oscillation the base 30 of the semiconductor device 24 is driven negative so that the semiconductor device starts conducting and the winding 16 of the relay is energized. Energizing of the relay closes contacts 52 and 76 and 8 and 12. This closes the lamp circuit and completes the circuit between capacitor 50 and ground. With the ground circuit completed to the capacitor 50, removal of touch from touch responsive device 66 does not affect the oscillation of the oscillating circuit 44. Therefore the pulses continue to be supplied to the base of the semiconductor device 24 and the semiconductor device remains conducting.

To stop conduction of the semiconductor device 24 and to turn the light off, the other touch responsive device 64 is contacted. This suppresses the application of the oscillating energy from the oscillator 44 to the base 30. The semiconductor device therefore stops conducting and the relay is denergized. With deenergization of the relay contacts 52 and 76, and 8 and 12 are broken so that the lamp circuit is opened and the capacitor 50 is removed from the oscillating circuit. Since the capacitor 50 is removed from the oscillating circuit the oscillator stops conducting and the removal of touch from the touch responsive element 64 is ineffectual in returning the negative pulses to the base of the semiconductor device. With the base 24 of the semiconductor device remaining positive the relay 10 remains deenergized.

In certain cases regulation of the voltage supplied to the touch control circuit is desirable.

In the circuit of FIG. 3 a voltage regulator 78 is inserted into the circuit between the resistor 22 and the oscillator 44. This voltage regulator consists of a diode 80 for rectifying the voltage received from the AC source, a filter consisting of a resistor 82 and a capacitor 84 for filtering the rectified voltage and two neon tubes 86 and 88 for regulating the output of the filter. One of the neon tubes 88 is bypassed by resistor 90 to insure the firing of the other. The output of the regulator is used to supply positive potential through resistor 92 to the base of the semiconductor device 24 and the excitation for the oscillator 44.

Figure 3A:
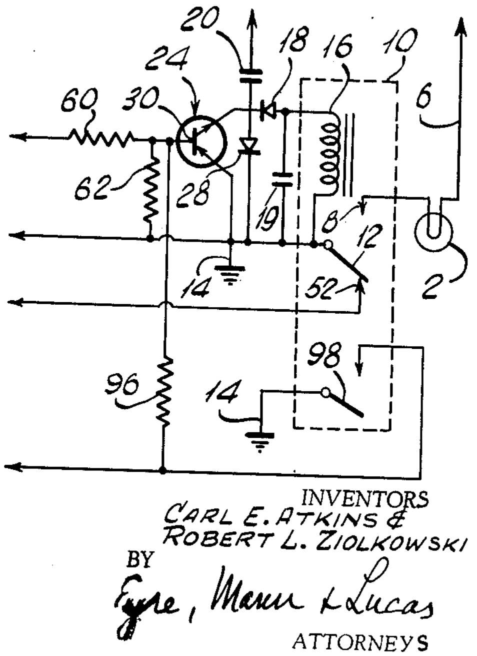

To insure a positive switching of the semiconductor device 24, the positive potential at the base 30 of the semiconductor device is varied depending on whether the semiconductor device is conducting or non-conducting. This variation is obtained, in the case of FIG. 3, by the provision of an additional bias supply 94 for the base 30, which is removed when the relay is energized or, in the case of FIG. 3*a*, by the provision of a resistor 96 which, when the relay is energized, is connected in parallel with resistor 62 to reduce the positive bias on the base 30. A second grounded arm 98 of the relay completes the circuit for resistor 96 when the relay is energized. In operation, device 24 is normally kept conducting by the signal from oscillator 44. Thus the relay winding 16 is normally shunted and deenergized. To energize the relay the element 64 is touched to suppress application of the oscillating energy from the oscillator 44 to base 30 and render the semiconductor device non-conducting. When the semiconductor device is non-conducting sufficient current flows through winding 16 to energize the relay. The ground circuit to capacitor 50 is then broken at contact 52 and the ground circuit to the lamp 2 is completed. Also the positive potential at the base 30 is decreased in FIG. 3 by shorting out the input to the bias supply 94 so that it ceases to supply positive potential to the base or in the alternative circuit of FIG. 3*a* by connecting resistor 96 between the base of the semiconductor device and ground so that it decreases the positive potential supplied by the regulator 78 to the base.

With the ground circuit to capacitor 50 broken the capacitor is taken out of oscillator circuit 44 and therefore the oscillator circuit stops oscillating. Thus when the touch is removed from element 64, the oscillator will not supply negative pulses to the base 30 to keep the relay conducting.

To deenergize the relay the second touch element 66 is touched to introduce body capacitance of the person touching the element and capacitor 68 into the oscillating circuit 44. This oscillating energy by then becomes sufficient to drive the lowered positive potential at the base 30 negative to trigger the semiconductor device 24 into conduction. The relay 10 is thereupon deenergized breaking the ground circuit to the lamp 2 and completing the ground circuit to the capacitor 50. With the capacitor 50 back in the oscillator circuit the oscillations continue after touch is removed from second touch responsive device 66 thereby keeping the relay deenergized.

The circuit of FIG. 4 represents still another way in which the semiconductor device 24 may be controlled. Here, as in the circuits of FIGS. 1 and 3, the output of the low frequency oscillator 44 is coupled through the capacitors 56 and 58 and resistor 60 to the base 30 of the semiconductor device 24. Touching of the element 64 suppresses the application of energy to the base 30 through this path with the result that the output 100 of a positive bias supply 102 keeps the base positive and the semiconductor device non-conducting. The positive bias supply 102 consists of diode 104 and an amplifier 106. The output of the oscillator 44 is connected to the input of the amplifier 106 by two capacitors 108 and 110 and a resistor 112 connected in series so the output of the supply 102 is dependent on the input from the oscillator.

In this circuit, breaking of the contacts 12 and 52, with energization of the relay 10, does not disconnect a capacitor from the oscillatory circuit 44 as in the circuit of FIG. 1, but removes a bleeding resistor 114 from the output 100 of the positive bias supply 102. The removal of this resistor 114 increases the positive potential at the base 30 of the semiconductor device 24 and prevents device 24 from becoming conductive upon removal of the hand from the touch responsive device 64. The semiconductor switching means 24 thus remains non-conducting.

The second touch responsive element 66 is coupled between the input to the positive bias supply 102 and the output of the oscillating circuit 44, so that when it is touched it suppresses the application of the oscillating energy to the network 102. This in turn reduces the positive potential at output terminal 100 and permits base 30 to be driven negative by the signal received through capacitors 56 and 58 and resistor 60. With the base 30 again being negatively pulsed the semiconductor device 24 conducts thus deenergizing relay 16 and returning the resistor 114 into the circuit.

In the oscillator 44 of this circuit the glow tube 116 is connected between the output 118 of the oscillator and the ungrounded terminal 4 of the power supply through a diode 120. The capacitor 122 and resistor 124 are connected in parallel between ground 14 and the output 118. The operation of this oscillator differs from the oscillator of the prviously described circuits of FIGS. 1 and 3 in that the glow tube fires immediately and does not have to wait for the capacitor 122 to charge.

The invention has now been described with reference to a number of different embodiments illustrating various arrangements for controlling a load in response to the touch of an individual.

In each embodiment of the invention the load circuit is controlled by a relay which, in turn, is controlled by the condition of a semiconductive device. The semiconductive device, in each embodiment of the invention is rendered conductive by application to a control electrode thereof, of pulsating energy from a low frequency oscillator, the pulsating energy overcoming a bias potential applied to the electrode from a suitable bias source. Two touch responsive elements are provided, one to be touched when the semiconductor device is to be triggered in one direction and the other to restore the device to its initial condition. The relay, in each case, controls circuitry effective to maintain the conditions resulting from touch of the first touch responsive element until the second element is touched.

In some embodiments of the invention, the circuitry controlled by the relay effects the operation of the oscillator. In other embodiments the circuitry controlled by the relay varies the bias on the control electrode of the semiconductor device or it opens or closes connections to other electrodes of the semiconductor device.

In all the described embodiments of the invention the semiconductor device is a four-layer N-gated semiconductor device. However, it should be obvious that other devices having similar characteristics which are switched by the application of voltage to a control electrode would be applicable for use in the circuits of the invention. Further it is understood that other changes may be made within the scope of the invention and this application is intended to cover all changes and modifications of the described form of the circuits herein chosen for purposes of illustration, which do not constitute a departure from the spirit of the invention or the scope of the accompanying claims.

What is claimed is:

1. A touch responsive circuit for connecting and disconnecting a load to a source of electrical energy comprising:

(a) a semiconductive switching means having a gating terminal;

(b) a low frequency source of oscillatory energy coupled to the gating terminal of said semiconductive switching means to keep the semiconductive switching means in one of its two operating states;

(c) a first tourch responsive means coupled to said source of oscillatory energy which when touched suppresses the application of oscillatory energy to the gating terminal of the semiconductor switching means to switch the semiconductive switching means to the other of its operating states;

(d) a relay coupled to the semiconductive switching means for coupling and uncoupling the load to the source of electrical energy as a function of the operating state of the semiconductive switching means, said relay having contacts which open and close as a function of said operating state of the semiconductive switching means;

(e) means including contacts of the relay for preventing the semiconductor switching means from being switched back to the first of its operating states after touch is removed from the first touch responsive means; and (f) a second touch responsive means coupled to said source of oscillatory energy which when touched while the semiconductive switching means is in the second of its operating states increases the magnitude of the oscillating energy supplied by the low frequency source of oscillatory energy to said semiconductive switching means to switch said semiconductive switching means back to the first of its operating states.

2. The circuit of claim 1 wherein said semiconductive switching means comprises a four layer semiconductor and wherein a source of bias is coupled to said gating terminal, the output of said source of bias being summed at the gating terminal with the oscillatory energy from said source of oscillatory energy.

3. The circuit of claim 2 wherein the relay is coupled in series with the four layer semiconductor and the source of electrical energy so that the relay is energized when the four layer semiconductor conducts.

4. The circuit of claim 2 wherein a capacitor is connected in series between the four layer semiconductor and the source of electrical energy.

5. The circuit of claim 2 wherein the relay is coupled in parallel with the four layer semiconductor across the source of electrical energy so that the relay is deenergized when the four layer semiconductor conducts.

6. The circuit of claim 5 wherein the source of oscillatory energy is a relaxation oscillator including a resistor, a capacitor and a neon tube coupled between the source of electrical energy and the gating terminal of the four layer semiconductor.

7. The circuit of claim 6 wherein (a) said relay contacts are coupled to the capacitor in the oscillator to remove the capacitor therefrom when the four layer semiconductor is non-conductive; and (b) said second touch responsive means is a touch responsive element and a capacitor coupled to said oscillator to introduce capacitance into the oscillator when the touch responsive element is touched and thereby restore oscillation thereof.

8. The circuit of caim 7 wherein said source of bias includes a bleeding resistor coupled to the relay contacts to decrease the bias at the gating terminal of the four layer semiconductor when the device is not conducting.

9. The circuit of claim 5 wherein said source of bias includes a bleeding resistor so coupled to the relay contacts as to increase the bias at the gating terminal of the four layer semiconductor when said semiconductor is not conducting.

10. The circuit of claim 9 wherein (a) the source of bias is coupled to the source of oscillatory energy to derive its electrical excitation therefrom; and (b) the second touch responsive means is a touch responsive element coupled between the source of bias and the source of oscillatory energy so that when the touch responsive element thereof is touched it suppresses the supply of electrical energy to the source of bias.

11. A touch responsive circuit for connecting and disconnecting a load to a source of electrical energy comprising:

(a) a relay for connecting and disconnecting the load to the source of electrical energy;

(b) circuit elements coupling the relay to the source of electrical energy;

(c) a semiconductive switching means having a gating terminal which has a conducting and a non-conducting state and is coupled in parallel with the relay and in series with the circuit elements so that in its conducting state it will limit the flow of current through the relay below the level necessary to keep the relay energized;

(d) a low frequency oscillator coupled to the gating terminal of said semiconductive switching means to provide oscillating energy to keep the semiconductive switching means in its conducting state;

(e) a touch responsive element coupled between the gating terminal and the low frequency oscillator which when touched suppresses the application of the oscillating energy to the semiconductive means so the semiconductive means switches from its conducting to its non-conducting state and energizes the relay;

(f) a second touch responsive means coupled to the low frequency oscillator which when it is touched while the relay is energized increases the magnitude of the oscillating energy supplied by the low frequency oscillator to the semiconductor switching means sufficiently to render the semiconductor switching means conductive and thereby deenergize the relay momentarily; and (g) means including contacts of the relay coupled to the low frequency oscillator to stop oscillation of the oscillator when the first touch responsive element is touched.

12. The circuit of claim 11 wherein one of said circuit elements is a capacitor.

13. The circuit of claim 11 wherein said semiconductive means includes a four layer PNPN semiconductor having a source of positive voltage coupled to the inner N zone which functions as the gate terminal.

14. The circuit of claim 13 including a diode connected in parallel with said semiconductor and said relay to shunt the relay during positive half cycles of the supply voltage.

15. The circuit of claim 13 wherein said low frequency oscillator comprises a relaxation oscillator including a resistor, a capacitor and a neon tube coupled to the source of electrical energy.

16. The circuit of claim 19 wherein (a) said relay contacts are coupled to the capacitor in the low frequency oscillator to decouple the capacitor from the source of electrical energy when the relay is energized and thereby stop oscillation of the oscillator; and (b) the second touch responsive means when touched couples a substitute capacitance into the oscillator circuit to start oscillation.

References Cited by the Examiner

UNITED STATES PATENTS

| | | | |
|---|---|---|---|
| 2,704,339 | 3/55 | Westcott et al. | 317—149 X |
| 2,743,433 | 4/56 | Parmet | 340—258 |
| 2,992,420 | 7/61 | Riker | 340—258 |
| 3,025,434 | 3/62 | Atkins et al. | 317—149 X |
| 3,081,594 | 3/63 | Atkins et al. | 317—149 X |
| 3,109,893 | 11/63 | Burns | 340—258 |
| 3,111,608 | 11/63 | Boenning et al. | 317—148.5 X |

SAMUEL BERNSTEIN, *Primary Examiner.*

LLOYD McCOLLUM, MAX L. LEVY, *Examiners.*